(Model.) 3 Sheets—Sheet 1.
W. A. C. OAKS.
MACHINE FOR PARING AND STONING PEACHES.
No. 348,532. Patented Aug. 31, 1886.
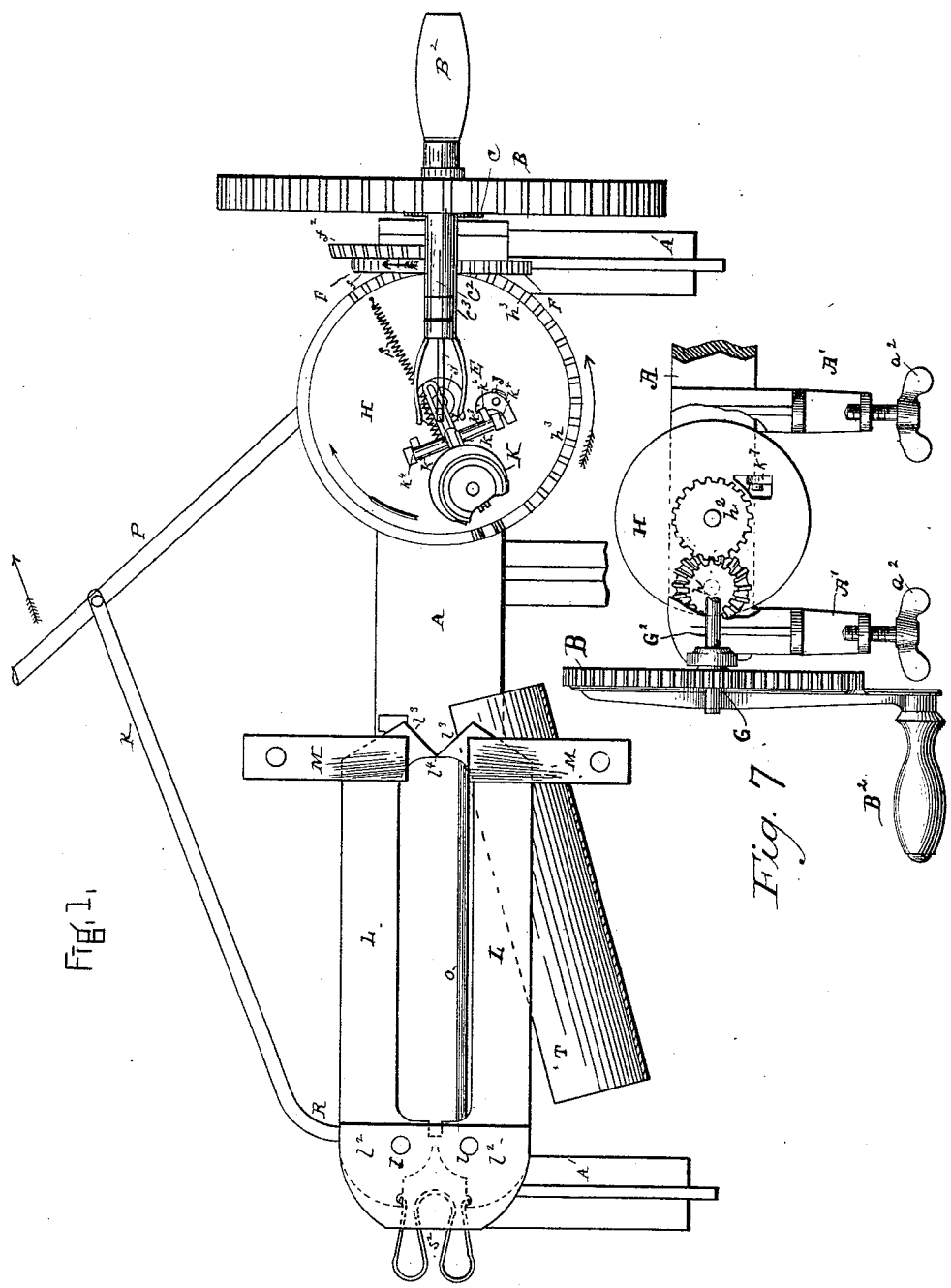
WITNESSES:
G. H. Abbey
Hartshorn White
INVENTOR
Wm. A. C. Oaks
BY Wm. G. Button
ATTORNEY (Model.) 3 Sheets—Sheet 2.
W. A. C. OAKS.
MACHINE FOR PARING AND STONING PEACHES.
No. 348,532. Patented Aug. 31, 1886.
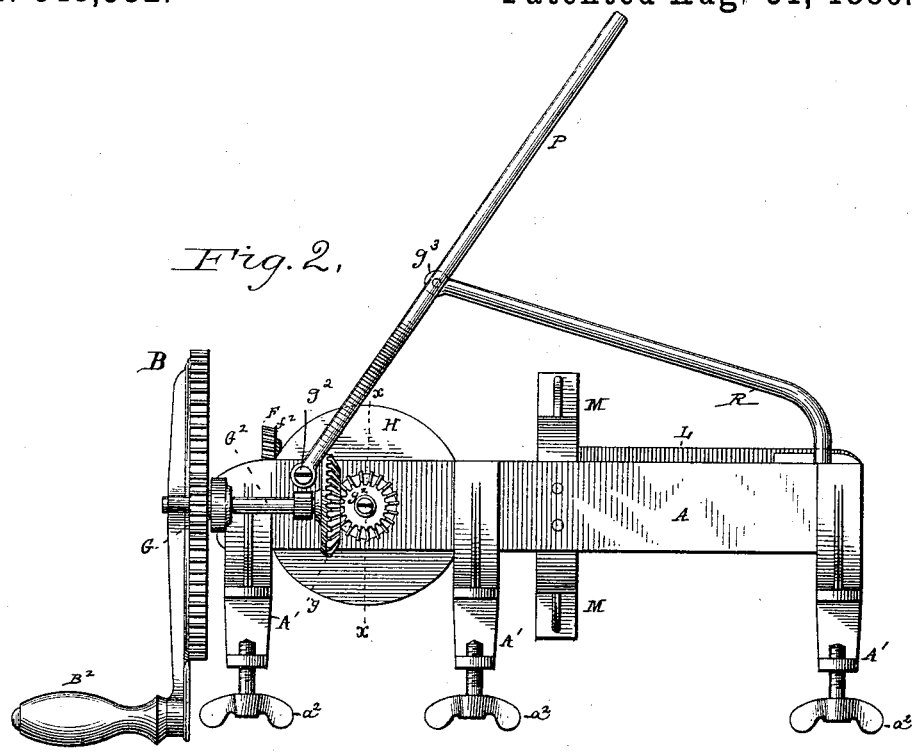
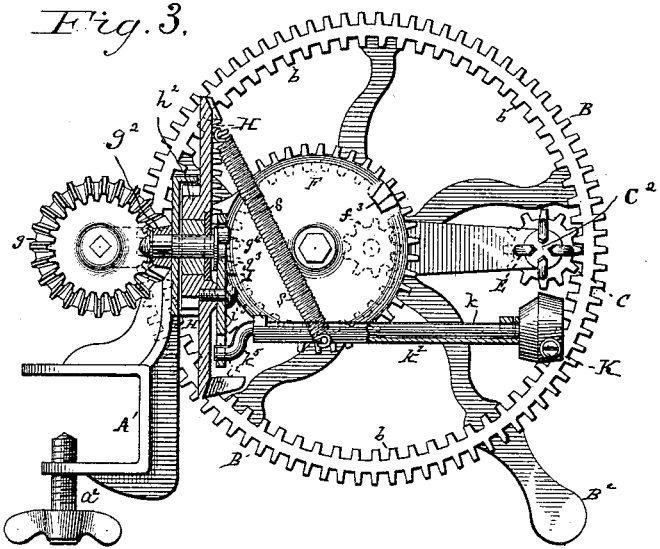

(Model.)
W. A. C. OAKS.
MACHINE FOR PARING AND STONING PEACHES.
No. 348,532.
3 Sheets—Sheet 3.
Patented Aug. 31, 1886.
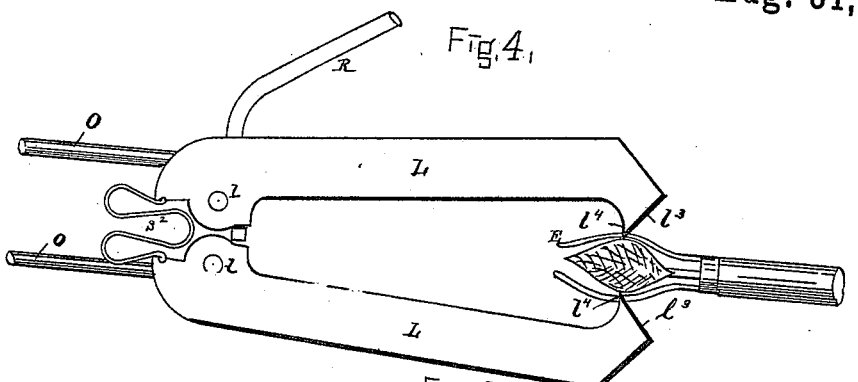
Fig. 4.
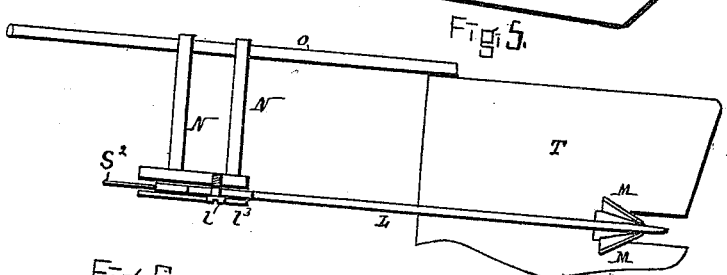
Fig. 5.
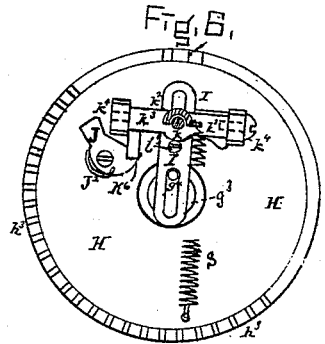
Fig. 6.
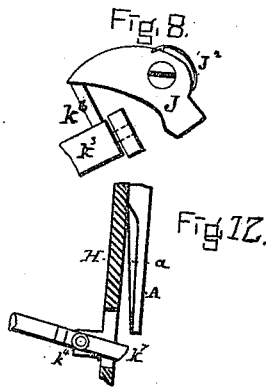
Fig. 8.
Fig. 12.
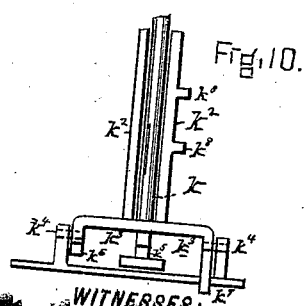
Fig. 10.
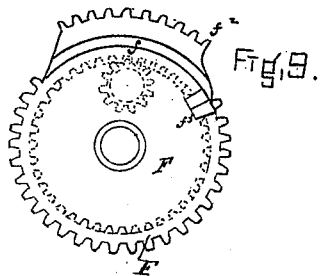
Fig. 9.
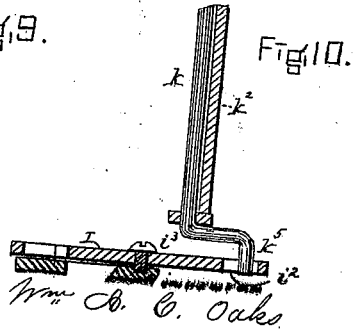
Fig. 10.
WITNESSES
Wm. A. C. Oaks
BY Wm. G. Button
ATTORNEY

UNITED STATES PATENT OFFICE.

WILLIAM A. C. OAKS, OF ANTRIM, NEW HAMPSHIRE, ASSIGNOR TO THE GOODELL COMPANY, OF SAME PLACE.

MACHINE FOR PARING AND STONING PEACHES.

SPECIFICATION forming part of Letters Patent No. 348,532, dated August 31, 1886.

Application filed June 18, 1885. Serial No. 169,037. (Model.)

*To all whom it may concern:*

Be it known that I, WILLIAM A. C. OAKS, of Antrim, Hillsborough county, New Hampshire, have invented certain new and useful Improvements in Machines for Paring and Stoning Peaches, of which the following is a full and complete specification.

The object of my invention is to provide a machine that will pare and stone peaches without injury to the pulp and with great rapidity.

To this end my machine consists of an improved combination of parts to give the oscillatory motion to the paring-knife, which is necessary in paring peaches; in an improved combination of parts for rotating the knife-carrying turn-table, and effecting the quick return motion of the paring-knife and the turning-table after the peach has been pared. The motion of the turn-table while the knife is at work requires two turns of the crank, while the return motion requires but one turn; in an improved combination of parts for throwing the paring-knife on or off the peach; and, finally, in a device for removing the peach-stones from the pulp after paring. This latter device may be operated by hand independently, and not necessarily combined with the particular paring devices described; but it may also be operated automatically by the same driving mechanism as the paring portion of the machine.

In the drawings, Figure 1 is a front elevation of the entire machine. Fig. 2 is a rear side elevation of the entire machine, the reverse of Fig. 1, with the omission of the trough T. Fig. 3 is a section through the gears on line $x\ x$ of Fig. 2, showing the means for operating the turn-table and oscillating the knife, and also the connection of the intermediate gearing with the driving-wheel. Fig. 4 is an enlarged detail view of the stoning device in side elevation. Fig. 5 is a plan view of the stoning device. Fig. 6 is a plan view in detail of the upper side of the turn-table. Fig. 7 is a plan view of the under side of the turn-table, showing the gearing by which it is operated. Fig. 8 is a plan view of the latch or cam for throwing the paring-knife on or off the fruit. Fig. 9 is a face view of the wheel, which gears with the turn-table by one set of teeth, effecting the cutting motion of the turn-table when the paring-knife is acting, and by the other set of teeth effecting the quick return. Fig. 10 is a front elevation of the knife-rod and its supports. Fig. 11 is a side view and partial vertical section of the knife-rod, its inclosing half tube or case, and the lever and crank which give it an oscillatory motion. Fig. 12 is a cross-section through a portion of the turn-table and the frame of the machine, showing the end of the knife-arm and the recess in the frame, which acts as a cam to throw the knife-arm back so that the latch can slip under the heel of the knife-arm.

To a frame, A, clamps A' A' A', of the usual construction, are attached, of which $a^2\ a^2\ a^2$ are the thumb-screws. At the left hand the stoning device is attached, which will be described further on, and at the right-hand end a gear-wheel, B, is mounted upon a suitable journal and operated by means of a crank, $B^2$. This gear-wheel B has teeth $b$, also, upon the inside of its rim, and these gear with a pinion, C, attached to a shaft, $C^2$, to whose outer end the fork E is attached.

$C^3$ is the fork journal-bearing attached by a projecting arm to the frame of the machine.

In the rear of the main wheel, as shown in the drawings, Fig. 2, is a pinion, G, gearing with this wheel and communicating motion to the oscillating device for the paring-knife by means of the shaft $G^2$ and bevel-wheel $g$, which latter wheel meshes with the bevel-pinion $g^2$ on the shaft of the revolving disk $g^3$.

On the inside of the arm of the frame which carries the main wheel and attached to the end of the journal of the main wheel is a small pinion (shown dotted in Fig. 3,) gearing with the teeth on the inside of the vertical wheel F. These teeth, which are also shown dotted, go around the entire circumference of the wheel, which thus receives a continous rotary motion in one direction. This wheel F has teeth upon about three-fourths of its outer circumference, gearing with teeth upon one half of the circumference of the turn-table H. The remainder of this portion of F is without teeth, but a small offset, $f^2$, has teeth filling up the part of a complete circle left blank in the portion $f$. The toothed arc $f^2$ is so arranged as to mesh with a bevel-wheel, $h$, pivoted to the frame between it and the turn-table H. This wheel $h$ is in gear with an equal wheel, $h^2$, having an opposite bevel. The inverted bevel-wheel $h^2$ is firmly secured to the turn-table H and turns with it freely about the disk $g^3$ as an axis. When the teeth $f$ are in gear with the teeth $h^3$ of the turn-table, it turns in the direction indicated by the inside arrow on Fig. 1, and the peach is pared; but when the teeth $f^2$ come into gear with the wheel $h$, the turn-table is rotated in the reverse direction and with twice the speed.

The paring-knife K, semicircular in form, is mounted upon a knife-rod, $k$, inclosed in a semicircular case, $k^2$, which is bent outward at the bottom into two horizontal arms, $k^3 k^3$, which are pivoted at $k^4 k^4$ to lugs attached to the body of the turn-table. The lower end of the knife rod $k$ is bent into a crank, $k^5$, which fits into a slot, $i^2$, in one end of a lever, I, pivoted at $i^3$, and having at its other end a slot in which a pin, $g^4$, attached to the revolving disk $g^3$, can operate, producing a vibratory motion in the lever I, and a consequent oscillation of the knife. A small arm, $k^6$, projects from one of the arms $k^3$, which forms an axis for the knife-rod case $k^2$, and, according to the position of the knife and turn-table, is either under or over the small latch or cam J, pivoted to the turn-table and kept in place by a spring, $J^2$. The other arm of the knife-rod case projects through the turn-table at $k^7$, and is so shaped as to press against a groove, $a$, cut on the inside of the frame A. This portion of the knife-rod case and the cam-groove on the frame act to throw the knife-arm out, so that the latch J, forced by the spring $J^2$, can slip under the arm $k^6$ and keep the knife out of action. When during the revolution of the turn-table the latch reaches the projection $f^3$ on the wheel F, it is forced back from under the arm $k^6$, and the knife is drawn to its work by the spiral spring S, which is secured at one end to the turn-table and at the other to one of the lugs, $k^8$, on the knife-rod case, so that the tension of the spring can be varied as required.

The stoning device consists of a pair of knives, L L, pivoted at $l\ l$ to a frame, N, which may be made to slide upon guide-rods O O by means of levers P R, P being pivoted to the frame A, and R, which is pivoted to it, being likewise pivoted to the sliding frame N. The ends of the knives are bent, as shown, and have a sharp bevel, $l^3$, in front and a point, $l^4$, where they meet. They are pressed together by a spring, $S^2$, placed at the rear of the blades, and are kept from lateral motion by a plate, $l^2$, through which the pivots $l\ l$ pass. Near the outer ends of the knives are two guide-plates, M M, which are set so as to meet in an acute angle and flare outward to divide the pulp after it has been separated by the beveled ends of the knives. The stone is firmly grasped by the points of the knives, and when the frame is drawn back the stone is pulled out and the pulp is kept back by the plates M M, which are attached by means of arms to the principal frame. A trough of sheet metal, T, is arranged beneath to catch the separated pulp of the peach and allow it to slide into a pan or other receptacle placed beneath. This stoning or pitting device might be attached to the driving mechanism of the machine, but, as shown, it is intended to be worked independently by means of the lever R.

The method of operation of the machine is as follows: A peach is placed upon the fork, the stone entering between the tines of the fork, which are curved for this purpose. Then, supposing the knife to be in the proper position to start paring, the crank is revolved through two complete revolutions by the wheel F, gearing directly with the teeth on the edge of the face of the turn-table. The knife has been oscillated all this time continuously by the crank and lever described. When the peach has been pared, the crank being still rotated in the same direction one more turn, the toothed arc $f^2$ gears with the bevel-wheels $h$ and $h^2$ on the back of the turn-table, and the latter is revolved in the direction of the outside arrow of Fig.1 with twice its former speed, bringing the paring-knife back to the proper position for the next peach. The stoning-knives L L are then brought up by moving the lever R in the direction of the arrow, and as the beveled ends $l^3\ l^3$ of the knives strike against the peach they enter the pulp and are forced apart by the stone, against which they are tightly pressed by the spring $S^2$. In this way they divide the pulp and the points catch on the stone. The motion of the lever R is then reversed, and the knives L L with their frame are drawn back, carrying with them the stone. The pulp is forced off by the plates M M. This completes the whole operation.

While the stoning device is being operated the crank of the paring mechanism is not turned.

I am aware that forks with curved tines and an oscillating knife have been used in peach-paring machines.

Having now fully described my invention, what I claim and desire to secure by Letters Patent, is—

1. In a fruit-paring machine, the combination of a turn-table, a paring-knife-rod case pivoted to the turn-table, the knife-rod cranked at its lower end and inclosed by said case, a lever pivoted to the turn-table and having a slot in one end for the reception of the knife-rod crank, a disk having an eccentrically-located pin which engages the other end of said lever, a bevel-pinion attached to the shaft of said disk, a main driving-wheel, and intermediate gearing, as described, for continuously revolving the disk and for rotating the turn-table first in one direction and then in the other, substantially as described.

2. In a fruit-paring machine, the combination of a turn-table toothed upon one half of the circumference of its outer edge, and having secured to its back a bevel-wheel, with a wheel intermediately driven from the main driving-wheel, and provided with teeth upon a part of its circumference to give the turn-table a portion of a revolution, and with a toothed sector of greater radius than the other toothed portion thereof, and a bevel-wheel revolving upon the machine-frame and gearing with the first-mentioned bevel-wheel attached to the turn-table, substantially as shown and described.

3. In a fruit-paring machine, the combination of the turn-table H, the latch or cam lever J, pivoted to said turn-table, the knife-rod case having the projecting arm $k^6$ and projection $k^7$, and the spring $J^2$, with the cam-groove surface upon the machine-frame, and with the wheel F, having a cam, $f^3$, all arranged substantially as shown, and for the purpose set forth.

4. In combination with the peach-holding fork, the two pivoted stoning-knives, hooked, pointed, and beveled, at their ends, substantially as shown, a spring for pressing said knives together, and a frame to which said knives are pivoted, guide-rods on which said frame may be reciprocated, and plates of metal set upon each side of the operating ends of both knives at an oblique angle thereto, substantially as shown, and for the purpose set forth.

5. A stoning device for peaches, consisting of the combination of the knives L L, hooked, pointed, and beveled, substantially as shown, the frame $l^2$, to which said knives are pivoted, guide-rods O, forming part of the machine-frame, the levers R and P, pivoted to each other and to the sliding frame $l^2$ and the fixed frame A, respectively, the spring $S^2$ and the plates M, set upon each side of both knives at an oblique angle thereto, the whole constructed substantially as shown and described.

6. In a fruit-paring machine, the combination of a main driving-wheel, B, a pinion, C, gearing with it and with a pinion attached to fork E, a turn-table, H, toothed upon one half its circumferance, a wheel, F, gearing with a pinion affixed to the main shaft, and also bearing a toothed arc, $f^2$, gearing with a bevel-wheel, $h$, (pivoted to frame,) and which in turn gears with an inverted bevel-wheel, $h^2$, secured to the back of the turn-table, a paring-knife, K, oscillated by a crank, $k^6$, lever I, and revolving disk $g^3$, all constructed and operated, substantially as shown and described.

In witness whereof I have hereunto set my hand.

WILLIAM A. C. OAKS.

Witnesses:
HENRY A. HURLIN,
C. S. ABBOTT.